Figure 1:
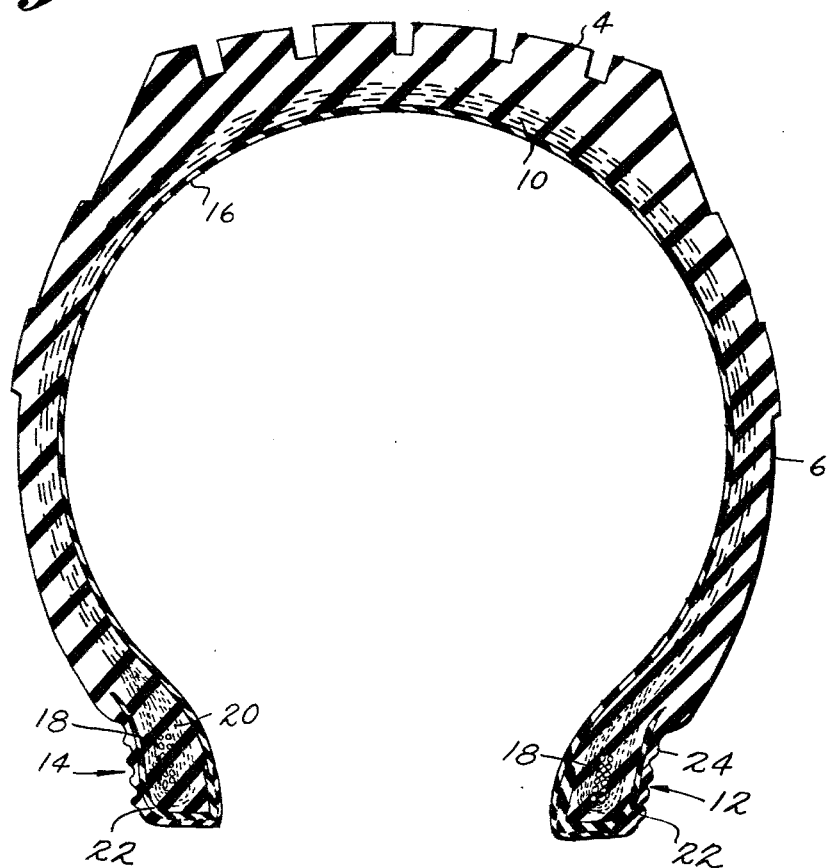

March 15, 1966     E. C. ATWELL     3,240,251

COTTON TIRE FABRIC AND METHOD OF MAKING SAME

Filed April 5, 1963

INVENTOR.
EVERETT C. ATWELL
BY
Cushman, Darby & Cushman
ATTORNEYS

United States Patent Office 3,240,251
Patented Mar. 15, 1966

3,240,251
COTTON TIRE FABRIC AND METHOD OF MAKING SAME
Everett C. Atwell, Greensboro, N.C., assignor to Burlington Industries, Inc., Greensboro, N.C., a corporation of Delaware
Filed Apr. 5, 1963, Ser. No. 270,828
7 Claims. (Cl. 152—362)

The present invention relates to improved tire fabrics, such as chafer and flipper strips, and tubeless tire constructions containing the same.

Conventional tubeless tire constructions employ a carcass of rubber provided with wheel rim-engaging portions or beads which are reinforced by circumferentially extending cores of wire or other relatively rigid material. These wire cores are covered by strips of fabric known in the art as "flipper strips," the latter extending upwardly into the side walls of the tire to stiffen the latter. Over the exterior of the tire carcass in the regions of the beads and extending at least partially about the latter are chafing or finishing strips which are intended to resist abrasion of the tire by the rim flanges on which the tire is mounted. These flipper and chafing or finishing strips may comprise woven or nonwoven fabric and a wide variety of materials and fabric constructions have previously been proposed.

One of the major considerations in preparing tire fabric of the above type is the requirement that the fabric be non-airwicking or air-impermeable in order to prevent the escape of air from the tire. Typical prior efforts in this regard are shown in U.S. Patents 2,905,222 and 2,978,784, both of which relate to the preparation of cotton chafer fabric. According to the first of these patents, air-impermeable chafer fabric may be prepared by impregnating cotton cloth with polychlorobutadiene (neoprene) cement containing organic solvent and thereafter slowly drying at relatively low temperatures. A drying time of at least 30 minutes and temperatures of the order of 70° to 180° F. are disclosed with indications that faster drying and higher temperatures are undesirable and do not produce an air-impervious fabric.

The other patent, 2,978,784, involves treating cotton fabric with an aqueous composition of resorcinol-formaldehyde/latex again followed by slow drying at low temperatures to obtain an air-impervious chafer fabric. This patent also teaches that high drying temperatures and rates of drying are to be avoided if an air-impervious product is desired.

Figure 2:
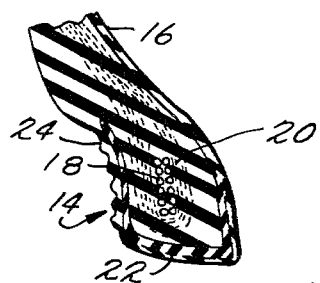

Despite the abovementioned prior efforts, it will be appreciated that there is considerable need for further improvement in the preparation of cotton tire fabrics which are air-impervious and it is the principal object of the present invention to provide such an improvement. A more specific object of the invention is the provision of a novel process for making air-impervious or non-airwicking cotton tire fabric which obviates prior art disadvantages, e.g. the need for slow drying times, the use of cements containing organic solvent and the like. Another object of the invention is to provide improved air-impervious cotton chafer or flipper strips and tubeless tire constructions containing the same. Other objects will also be apparent with reference to the following detailed description of the invention and the accompanying drawings wherein:

FIGURE 1 is a fragmentary perspective view partially in section of a tire embodying the invention; and FIGURE 2 is an enlarged fragmentary sectional view of a tire bead embodying a chafer element of the invention.

Referring more specifically to the drawings, FIGURE 1 shows a tubeless tire which includes a tread portion 4 surrounding an annular inner carcass 6 of resilient elastomeric material, such as compounded natural or synthetic rubber, and reenforcing cords, the latter being disposed in superposed plies 10. The inner periphery of the tire is defined by spaced bead portions 12 and 14 which are intended to fit on the rim of a vehicle wheel and cooperate therewith to provide the desired air chamber which obviates the need for a separate tube or container. The interior of the tire carcass is usually provided with a layer or lining 16 of an impervious elastomeric material such as the isoolefin-diolefin copolymer commonly known as butyl rubber.

The bead regions 12 and 14 are identical and are formed by turning the edges of the cord plies 10 successively about a circumferentially extending bead core 18, which may be formed by a bundle of wires suitably wrapped and provided with a flipper strip 20, the ends of which extend radially of the side wall of the tire. Extending externally over the turned ends or edges of the reenforcing cord plies 10 in each bead is the chafer or finishing strip 22. These strips are relatively narrow and extend transversely of the tire beads with the inner edge of each strip positioned within the interior of the tire carcass just above the bead toe. The strips extend across the bead bases and radially of the side walls a short distance to positions therein above the outer edges of the tire rim on which the tire is adapted to be mounted. The chafer strips 22 are usually, but not necessarily, calendared or otherwise laminated with unvulcanized compounded elastomeric material on both sides so that during curing of the tire they bond to the inner layer or liner 16 and the outer covering or side wall rubber 24.

The chafer and flipper elements in a tubeless tire must possess two important qualities, namely good adhesion to the rubber compound within which it is embedded and to resist the passage of air under pressure along the axis of the individual warp and filling yarns of which it is woven.

Untreated cotton fabrics have low and unsatisfactory adhesion to rubber and the yarns comprising such chafer and flipper fabrics freely conduct air along their axis. It is therefore necessary to treat such fabrics in a manner and with compositions that promote adhesion between the fabric and rubber and which effectively block the transmission of air under pressure along these yarns.

According to the invention the cotton chafer and flipper fabrics are rendered potentially adhesive to rubber and the yarns comprising the fabrics are rendered impervious to the transmission of air under pressure by first impregnating and substantially filling these yarns with natural or synthetic rubber applied from a suitable latex having small particle size followed by drying. Latices comprising this first step should not contain resorcinol-formaldehyde resin or organic solvent. This first step may be carried out as a single pass or in multiple passes through the latex, depending on such variables as the fabric weight, whether in the greige state or boiled off and the solids content of the latex to be used. Treatment with the latex serves to substantially or completely fill the yarns thereby blocking the transmission of air. However, the degree of adhesion imparted by this first step treatment is too low to be satisfactory for use as chafer fabric. Application of another composition as a second step in the processing of the fabric serves primarily to raise the adhesion to a satisfactory level and secondarily serves to fill any voids remaining in the yarns after the first step treatment. The composition used in the second step treatment is principally comprised of one or more types of latex and a resorcinol-formaldehyde partially condensed resin in water hereinafter referred to as resole. The presence of resorcinol-formaldehyde resole resin in the initial treatment of the fabric is undesirable and will not eliminate air-wicking except possibly in the case where the treatment is repeated an impractical number of times and/or undesirably low drying temperatures and slow drying rates are used.

The discovery that the presence of a resorcinol-formaldehyde resole resin in the initial composition is very detrimental is unexpected since these materials, or equivalent polyhydric phenols and aldehydes, as such or in the form of water-soluble partial condensation products thereof, are generally considered essential in the art to obtain a satisfactory tire fabric.

According to the present invention, the air-impervious tire fabric may be prepared from a wide variety of cotton fabric of lightweight, moderate or heavy construction. Preferably, the cotton fabric is first desized and may be bleached but greige goods can be treated directly without desizing, bleaching, dewaxing or like finishing operations. This presents another advantage in the present process since prior proposals using woven cotton fabric have considered it essential to first dewax or otherwise treat the goods before processing to render the same air-impervious.

A preferred way of carrying out the invention involves (1) an initial step wherein woven cotton fabric is impregnated with one or more passes through an aqueous styrene-butadiene latex which is free from organic solvent and resorcinol-formaldehyde (referred to herein as SBR composition for convenience); (2) then drying the fabric without curing; (3) thereafter subjecting the fabric to a second step treatment or pass wherein the fabric is impregnated with an aqueous, organic solvent-free composition (called RFL for convenience) which includes resorcinol-formaldehyde as well as a steyrene-butadiene-vinyl pyridine terpolymer latex, or mixtures of the terpolymer and butadiene-styrene copolymer latex; and (4) then again drying the fabric. The dried fabric may be given another pass with the resorcinol-formaldehyde/terpolymer latex or mixture of terpolymer and copolymer latex, if desired, although with appropriate selection of the solids concentration and solids add-on, a single pass therewith is usually sufficient. After the final resorcinol-formaldehyde latex treatment, the fabric may be cured as well as dried but there should not be any curing prior to this stage.

Desirably, the styrene/butadiene rubber in the initial pass is of small particle size, e.g. of the order of 600–1500 average angstroms. The rubber solids content in this pass may be widely varied and will depend on various other factors, e.g. the fabric construction and the fabric state (i.e. whether or not the goods are in greige form or have been partially or fully desized, bleached or otherwise finished). Usually, however, the amount of rubber solids in the first pass latex will be at least 15% by weight with 25–35% preferred. The dry solids pickup from this first pass will also vary but usually should amount to at least about 15% by weight of the treated fabric with 25–30% preferred.

The first pass may be carried out by dipping, padding or otherwise impregnating the fabric with the SBR latex diluted with water to the desired total solids content after which the fabric is dried at temperatures in the range of 220 to 300° F., care being taken to adjust the speed through the drying box to avoid any curing at this stage. The drying step may be conveniently carried out by circulating hot air until the fabric is substantially dry. This usually takes about 2 to 6 minutes at the indicated temperatures. The use of these relatively high temperatures and fast drying times represents a substantial departure from prior procedures and it is most surprising that non-airwicking is obtained despite the use of these rapid drying conditions.

The styrene-butadiene latex (SBR) used in the first pass is preferably a styrene-butadiene polymer made from a monomer ratio of from 50/50 to 70/30 parts of butadiene to styrene. However, terpolymers of these components with vinylpyridine, may also be used although the styrene-butadiene copolymers seem to give better adhesion results. Other aromatic substituted vinyl monomers may be used in lieu of styrene, e.g. methyl styrene, and the butadiene may be replaced by other conjugated diolefins such as 1,2-dimethyl butadiene or the like.

While the styrene-butadiene latices are preferred, other aqueous, organic solvent-free latex compositions may be effectively used for the first pass. In this connection, there may be mentioned butadiene-acrylonitrile polymer latices containing from 25–45% bound acrylonitrile. This includes, for example, butadiene-acrylonitrile copolymers and butadiene-acrylonitrile-styrene terpolymers in which the acrylonitrile content falls within the range indicated above. As examples of such latices, there may be mentioned those which are available under the tradenames "Pliolite," "Chemigum," "Hycar," "Nitrex," "Butaprene" and "Paracril." These latices may be prepared in known fashion by conducting polymerization of the butadiene and acrylonitrile, with or without another monomer, in aqueous emulsion with a redox catalyst system.

The RFL formulation, which is used in the second step and any subsequent passes, should include styrene-butadiene-vinylpyridine terpolymer as at least part of the latex solids component. It may be desirable to use styrene-butadiene copolymer rubber as part of the rubber constituent in this stage of the treatment but at least 20% by weight of the latex solids in the RFL formulation should be styrene-butadiene-vinylpyridine terpolymer. A particularly desirable vinylpyridine-butadiene-styrene terpolymer latex for use herein is that available under the tradename "Gentac" (General Tire). Other equivalent terpolymers for use herein are available as Hycar 2518 (Goodrich), Pyratex B (Naugatuck), Pliolite VP-100 (Goodyear Chemical) and Butaprene PL-96 (Firestone Plastics). These terpolymers may comprise, in parts by weight, from 50 to 95 parts butadiene, 5 to 50 parts vinylpyridine and, per 100 parts of butadiene/vinylpyridine, from 5 to 30 parts styrene. Typically suitable terpolymers for use herein are described in Mighton 2,561,215; Cislak et al. 2,402,020 and Wilson 2,652,353.

It is to be understood that, for present purposes, the term "butadiene-styrene-vinylpyridine terpolymer" is intended to embrace the lower alkyl derivatives of these various components such as 2:3-dimethyl butadiene-1,3; 5-ethyl-2-vinylpyridine and 2-methyl-5-vinylpyridine, and 4-methyl styrene, as well as the unsubstituted components, i.e. butadiene-1,3; vinylpyridine and styrene.

Where the butadiene-styrene-vinylpyridine terpolymer comprises only a part of the latex component, the remainder of the latex is preferably conventional butadiene-styrene copolymer rubber but may also be butadiene-acrylonitrile copolymer or the like. As noted, however, the vinylpyridine terpolymer content in the RFL pass should comprise at least 20% of the latex solids. Otherwise, it is not possible to obtain a chafer or flipper fabric with satisfactory bonding characteristics.

The aqueous, organic solvent-free resorcinol-formaldehyde terpolymer latex composition may be prepared in any convenient fashion (see my U.S. Patent 3,030,230 and pending application Serial No. 70,917). Usually, the ratio of resorcinol-formaldehyde to latex solids, in parts solids by weight, will come within the range of from about 1:12 to 1:2.5, preferably 1 part resole solids per 3.5 to 10 parts latex solids.

The aqueous RFL composition may be applied to the cotton fabric in any suitable way, as in the case of the resole-free latex treatment, e.g. by immersion followed by squeezing or by padding. The amount of RFL solids deposited on the fabric will vary but in the usual case will fall in the range of 5 to 21% by weight of the dry fabric after the SBR treatment. It should be understood, however, that the solids content selected for the SBR and RFL compositions, and the solids add-on necessary in these treatments to give non-airwicking, will vary from one situation to another depending on fabric construction and the state of the fabric, i.e. whether or not it is in the greige form, desized, boiled off with caustic or otherwise pretreated. Thus, for example, in the case of cotton greige goods of one type construction, it may be desirable or necessary to observe a minimum solids content of 30% and 20% by weight, respectively, for the first and second passes with a solids add-on of about 25 to 35 parts, respectively, in order to obtain complete air-impermeability. In contrast the same cotton fabric if first boiled off with caustic, may be rendered air-impermeable using a first pass of as little as 15–25% SBR or even lower, with 15–25 parts solids add-on, followed by a second RFL pass using 15% RFL with 23–35 parts total solids add-on. Usually, lower solids contents and solids add-on can be employed to obtain air-impermeability when treating greige goods than on goods which have been subjected to caustic boil-off or enzyme, soap and/or soda ash pretreatment.

After the RFL impregnation, the fabric should again be dried in the manner discussed above, particular attention being directed, as noted heretofore, to carrying out this drying operation under such conditions as to avoid curing or cross-linking of the RFL composition at least until the final RFL pass has been applied. Thereafter, the dried fabric may be given a cure at, for example, 280 to 330° F. for 5 to 3 minutes, to crosslink the resole/latex solids but this is not essential.

The cotton fabric, after the last RFL treatment and drying with or without a final cure, may be cut into the appropriate size and used directly in tire construction. Usually, however, a sheet of unvulcanized elastomer is calendared on each side of the fabric before the fabric is used in preparing the tire. Desirably, the elastomer sheet applied to one side of the fabric is butyl rubber or like material of high fluid imperviousness while the rubber sheet on the other side of the fabric may be natural rubber, GRS or the like. The resulting laminate is cut into strips as desired and used to complete the tire structure, the strips being bonded to the rubber tire carcass during the subsequent heat/pressure molding or vulcanization.

The air permeability or diffusion characteristics of the fabric of the invention may be determined using the method and apparatus described in U.S. Patent 3,034,336. Results showing 0 x 0 permeability, i.e. no airwicking or diffusion in either the warp or filling direction of the fabric, are attainable with the present process.

The invention is illustrated by the following examples wherein parts and percentages are by weight unless otherwise stated:

EXAMPLE 1

Cotton chafer fabric was prepared from 128 muslin sheeting (72 warp ends and 62 picks per inch) in the following manner:

The greige fabric was run through a styrene-butadiene latex comprising 25% rubber solids, the balance essentially water. The styrene-butadiene rubber was the copolymer of 50 parts styrene and 50 parts butadiene. After this operation, the fabric was dried in an oven with high velocity air at 220° F. The drying took about 5 minutes and was discontinued when a constant weight was attained. Dry solids pick-up amounted to 20%, based on the weight of fabric before the treatment.

The thus treated fabric was then impregnated with a 20% RFL solution prepared as described below. The fabric was then again dried as before to give a dry solids add-on of 27.7% based on the original weight of dry greige fabric.

The fabric processed in the manner described was tested for air diffusion in the manner shown in U.S. Patent 3,034,336 using unvulcanized compounded tire stock for laminating to the processed fabrics, and curing the assembly in the mold under normal curing conditions for this stock of 45 minutes at 290° F., with the mold under a pressure of at least 120 p.s.i. The resulting specimen tested by the method and apparatus of U.S. Patent 3,034,336 showed no leakage of air when subjected to an air pressure of 100 p.s.i. A 3 ply peel adhesion section prepared by sandwiching a layer of the uncured, compounded rubber stock between two layers of the fabric was similarly cured under a pressure of 120 p.s.i. and temperature of 290° F. for 30 minutes. The peel adhesion between the rubber and the fabric was 25 p.p.i. using a jaw separation speed of 2 inches per minute.

The RFL composition used above was prepared as follows:

PART A

|  | Parts |
|---|---|
| Resorcinol | 5.1 |
| 37% Formaldehyde | 6.5 |
| NaOH flakes | .23 |
| Water | 110 |
| (6.25% resin solution) | [1] 122 |

[1] Approximately.

PART B

|  | Wet Basis, parts | Dry Basis, parts |
|---|---|---|
| 6.25% Resin Solution (Part A) | 19.6 | 1.23 |
| 41% Gentac latex | 26.0 | 10.66 |
| 10% Triton X-100 solution | 1.26 | 0.13 |
| Water | 13.14 | --------- |
|  | 60.00 | 12.02 |

Ratio of latex to resin solids 8.7:1.0.

Preparation of Part A

90% of the water for Part A was measured into the resin preparation tank. The caustic soda flakes were added and the mixture stirred until the caustic was dissolved. The resorcinol was then added and dissolved by stirring. The formaldehyde and balance of the water were then added, the temperature of the water having been previously adjusted to 80° F. The resulting mixture was aged for 6 hours under controlled temperature conditions of 80–84° F. At the end of the 6 hours, the resulting resole resin solution (Part A) was used in the preparation of the composition (Part B).

Preparation of Part B

The Gentac latex was measured into a mixing tank. The 10% Triton 100 solution was added while stirring the contents of the mixing tank, followed by the dilute resole resin solution (Part A). The resulting mixture is ready for immediate use but may be stored for a limited time (about 3 days) at room temperature, or, for prolonged periods of time under refrigeration.

The RFL composition used herein may also be prepared by repeating the process outlined above except that Part A is made up in two separate stages. First, a so-called "arrested resin solution" is prepared using the following proportions:

|  | Parts |
|---|---|
| Resorcinol | 5.1 |
| NaOH flakes | .3 |
| 37% Formaldehyde | 2.15 |
| Water | 4.9 |
|  | 12.45 |

This arrested solution may be made by first adding the water to a suitable tank or drum. The NaOH flakes are then added and dissolved by stirring followed by addition and dissolution of the resorcinol. Thereafter, the formaldehyde is added, considerable heat being generated. The tank is cooled to prevent boiling and, after allowing the contents to cool, the resulting composition is stored in stainless steel or lined drums sealed to prevent entrance of air. This composition may be stored for an indefinite period of time as compared to not more than about 20 hours for the Part A composition referred to above.

To complete the RFL composition using the "arrested resin" solution (12.45 parts), this solution may be transferred from the storage drum to the reaction tank. There may then be added 4.3 parts of 37% formaldehyde and remaining parts of water, the water being added first, with agitation. The resulting mixture, after ageing for from 1–6 hours at 80–84° F., is ready for use herein to prepare cotton tire fabric.

EXAMPLE 2

The process of Example 1 was repeated except that a part of the styrene-butadiene-vinylpyridine terpolymer in the second pass was replaced by styrene-butadiene copolymer so that the rubber constituent in the second pass was 70% terpolymer and 30% copolymer. Solids add-on amounted to 21% in the SBR pass and 27.5% after the RFL pass.

The resulting product demonstrated 0 x 0 air diffusion and an adhesion of 17 pounds per inch on the peel test.

EXAMPLE 3

Example 1 was repeated except that the fabric was desized (enzyme treated) and bleached before treatment and the solids content of the first and second passes was reduced to 15% styrene-butadiene and 15% RFL, respectively. Solids add-on amounted to 14.4% in the first pass and 22.6% after the second pass. The resulting product showed 0 x 0 air diffusion and adhesion of 20 pounds per inch.

EXAMPLE 4

Example 3 was repeated except that the solids content of the first pass was increased to 20% styrene-butadiene rubber and part of the terpolymer was replaced with styrene-butadiene copolymer in the second pass so that the rubber constituent in the second pass was 70% terpolymer and 30% copolymer. Dry solids add-on was 19.4% and 28.5%, respectively, after each pass. The thus treated fabric gave 0 x 0 diffusion and adhesion to rubber of 18 pounds per inch.

Further examples following the procedure outlined above are set forth below using so-called Pepperell sheeting (21 warp ends and 20 picks per inch) and 30% SBR and 20% RFL as the first and second passes, respectively, to prepare cotton tire fabric:

| Example | Fabric | Total Solids Add-on After— | | Air Test | Adhesion, p.p.i. |
|---|---|---|---|---|---|
| | | 1st pass | 2nd pass | | |
| 5 | Greige fabric, enzyme treated, rinsed and extracted. | 32.9 | 45.8 | 0 x 0 | 24 |
| 6 | Greige fabric, enzyme treated, soda ash washed and extracted. | 34.6 | 54.1 | 0 x 0 | 29 |
| 7 | Greige fabric, enzyme treated, soap washed, soda ash rinsed and extracted. | 33.0 | 46.9 | 0 x 0 | 23 |

It will be appreciated that various modifications may be made in the invention described herein. For example, while the invention has been described above with special reference to the use of resole resorcinol-formaldehyde resin solutions which are preferred herein, it will be appreciated that other polyhydric phenols and aldehydes, respectively, may be used. Similarly, while the invention is preferably applied to woven cotton fabric of any desired type of weave, e.g. square, leno, etc., typically cotton duck or muslin sheeting, nonwoven fabric may also be treated in the manner and for the purposes described herein. Other modifications may also be made in the invention as defined in the following claims wherein, I claim:

1. A method of preparing a cotton tire fabric for the bead portion of a tire capable of being well bonded to rubber tire stock and wherein the yarns comprising said fabric are blocked against the passage of air under pressure along their longitudinal axes, said method comprising the steps of: impregnating the yarns of said cotton fabric with a latex; drying the fabric whereby the yarns comprising the fabric are rendered impervious to the passage of air under pressure along their longitudinal axes, said latex being free from resorcinol-formaldehyde and any additive which precludes rendering said yarns impervious; thereafter coating the yarns of said fabric with an aqueous resorcinol-formaldehyde/latex composition and drying whereby said fabric bonds well to rubber tire stock in a subsequent vulcanization step.

2. The method of claim 1 wherein said latex is an aqueous, organic solvent-free, styrene-butadiene rubber latex; said fabric is dried after impregnating said yarns by heating with hot air; said aqueous resorcinol-formaldehyde latex composition is an aqueous, organic solvent-free composition containing water-soluble resorcinol-formaldehyde condensation product and styrene-butadiene-vinylpyridine terpolymer latex and the fabric is dried after said coating step by heating with hot air.

3. A method of preparing a tire which includes a cotton tire fabric at the bead portion of the tire, said method including the steps of: impregnating the yarns of said cotton fabric with a latex; drying the fabric whereby the yarns comprising the fabric are rendered impervious to the passage of air under pressure along the longitudinal axes thereof, said latex being free from resorcinol-formaldehyde and any additive which precludes rendering said yarns impervious; thereafter coating the yarns of said fabric with an aqueous resorcinol-formaldehyde/latex composition and drying, thereafter positioning said fabric in contact with the bead portion of an unvulcanized tire carcass and vulcanizing under heat and pressure.

4. Cotton tire fabric for use in the bead portion of a tire and which is strongly bondable thereto, the yarns of said fabric being blocked against the passage of air under pressure along their longitudinal axes by means of a latex which is free from resorcinol-formaldehyde and any additive which precludes said blockage, said blocked yarns being coated with a resorcinol-formaldehyde/latex composition.

5. The fabric according to claim 4 wherein the latex free from resorcinol-formaldehyde comprises a styrene-butadiene rubber latex and the latex in the resorcinol-formaldehyde/latex composition is a styrene-butadiene-vinyl pyridine terpolymer latex.

6. A tire comprising a bead portion with the fabric of claim 4 bonded thereto.

7. A tire comprising a tire carcass and the fabric of claim 4 bonded thereto and positioned to function as a chafer.

References Cited by the Examiner

UNITED STATES PATENTS

| Re. 23,451 | 1/1952 | Mighton | 156—110 |
| 2,978,784 | 4/1961 | Koch | 156—110 |
| 2,991,258 | 7/1961 | Nobs et al. | 156—331 X |
| 3,013,599 | 12/1961 | Riggs | 156—110 |
| 3,097,109 | 7/1963 | Danielson | 156—110 |

EARL M. BERGERT, *Primary Examiner.*

C. B. COSBY, *Assistant Examiner.*